United States Patent
Yamamotoya et al.

(10) Patent No.: US 9,463,676 B2
(45) Date of Patent: Oct. 11, 2016

(54) SUSPENSION AND COMPRESSION COIL SPRING FOR SUSPENSION

(71) Applicant: NHK SPRING CO., LTD., Yokohama-shi, Kanagawa (JP)

(72) Inventors: Kenji Yamamotoya, Manesar (IN); Hideto Enomoto, Yokohama (JP); Ken Takahashi, Yokohama (JP); Toshiaki Sato, Yokohama (JP); Mitsuhiro Sugiyama, Yokohama (JP); Yoshio Kobayashi, Yokohama (JP); Taichi Inage, Yokohama (JP); Tomotake Kato, Yokohama (JP); Akihiko Nishikawa, Wolfsburg (DE); Masahiro Umezawa, Yokohama (JP); Michihiko Ayada, Yokohama (JP); Suguru Kajigaya, Yokohama (JP)

(73) Assignee: NHK SPRING CO., LTD., Tokyo (JP)

( * ) Notice: Subject to any disclaimer, the term of this patent is extended or adjusted under 35 U.S.C. 154(b) by 0 days.

(21) Appl. No.: 14/702,958

(22) Filed: May 4, 2015

(65) Prior Publication Data
US 2015/0231939 A1    Aug. 20, 2015

Related U.S. Application Data

(63) Continuation of application No. PCT/JP2013/080811, filed on Nov. 14, 2013.

(30) Foreign Application Priority Data

Nov. 16, 2012   (JP) .................................. 2012-252520

(51) Int. Cl.
*B60G 3/14*        (2006.01)
*B60G 11/14*       (2006.01)
(Continued)

(52) U.S. Cl.
CPC ................. *B60G 3/14* (2013.01); *B60G 11/14* (2013.01); *B60G 21/051* (2013.01); *F16F 1/043* (2013.01);
(Continued)

(58) Field of Classification Search
CPC ...... B60G 3/14; B60G 11/14; B60G 21/051; B60G 2200/132; B60G 2200/21; B60G 2200/22; B60G 2202/12; B60G 2206/426; B60G 2204/1244; B60G 2204/1246; F16F 1/042; F16F 1/043; F16F 1/06; F16F 2238/026

See application file for complete search history.

(56) References Cited

U.S. PATENT DOCUMENTS 3,727,940 A    4/1973   Hug
4,377,280 A *  3/1983   Wienand ................. F16F 1/043
                                              267/167

(Continued)

FOREIGN PATENT DOCUMENTS

CN            165484 A       8/2005
DE         3743451 A1 *      6/1989  ............. B60G 15/07

(Continued)

OTHER PUBLICATIONS

International Search Report (ISR) dated Dec. 24, 2013 issued in International Application No. PCT/JP2013/080811.
(Continued)

*Primary Examiner* — Laura Freedman
(74) *Attorney, Agent, or Firm* — Holtz, Holtz & Volek PC

(57) ABSTRACT

A knee-action-type suspension is provided with an arm member, a compression coil spring, and a shock absorber. The coil spring is extended and retracted between a full-rebound state and a full-bump state in accordance with the magnitude of a load applied to a vehicle body. A wire of the coil spring includes a large-diameter wire portion, a small-diameter wire portion, and a wire diameter varying portion. The large-diameter wire portion is provided in a first portion of the coil spring, which is on the side near to a pivot. The small-diameter wire portion is provided in a second portion of the coil spring, which is on the side far from the pivot. A wire diameter of the large-diameter wire portion is greater than a wire diameter of the small-diameter wire portion.

4 Claims, 6 Drawing Sheets

(51) Int. Cl.
*B60G 21/05* (2006.01)
*F16F 1/04* (2006.01)
*F16F 1/06* (2006.01)

(52) U.S. Cl.
CPC ..... *B60G 2200/132* (2013.01); *B60G 2200/21* (2013.01); *B60G 2202/12* (2013.01); *B60G 2204/1246* (2013.01); *B60G 2206/426* (2013.01); *F16F 2238/026* (2013.01)

(56) References Cited

U.S. PATENT DOCUMENTS

2015/0251514 A1* 9/2015 Yamamotoya ......... B60G 11/14 267/221
2015/0343871 A1* 12/2015 Tange .................... B60G 11/16 267/286
2016/0046164 A1* 2/2016 Yamamotoya ......... B60G 11/14 267/286

FOREIGN PATENT DOCUMENTS

| FR | 2097109 | A1 | 3/1972 |
| JP | 50013293 | Y1 | 4/1975 |
| JP | 59219534 | A | 12/1984 |
| JP | 2004050906 | A | 2/2004 |
| JP | 2004216922 | A | 8/2004 |
| JP | 2008018784 | A | 1/2008 |

OTHER PUBLICATIONS

International Preliminary Report on Patentability (IPRP) including Written Opinion (in English) dated May 28, 2015, issued in parent International Application No. PCT/JP2013/080811.
Chinese Office Action (and English translation thereof) dated May 26, 2016, issued in counterpart Chinese Application No. 201380059996.7.
Russian Office Action (and English translation thereof) dated Aug. 11, 2016, issued in counterpart Russian Application No. 2015118142/11(028197).

* cited by examiner

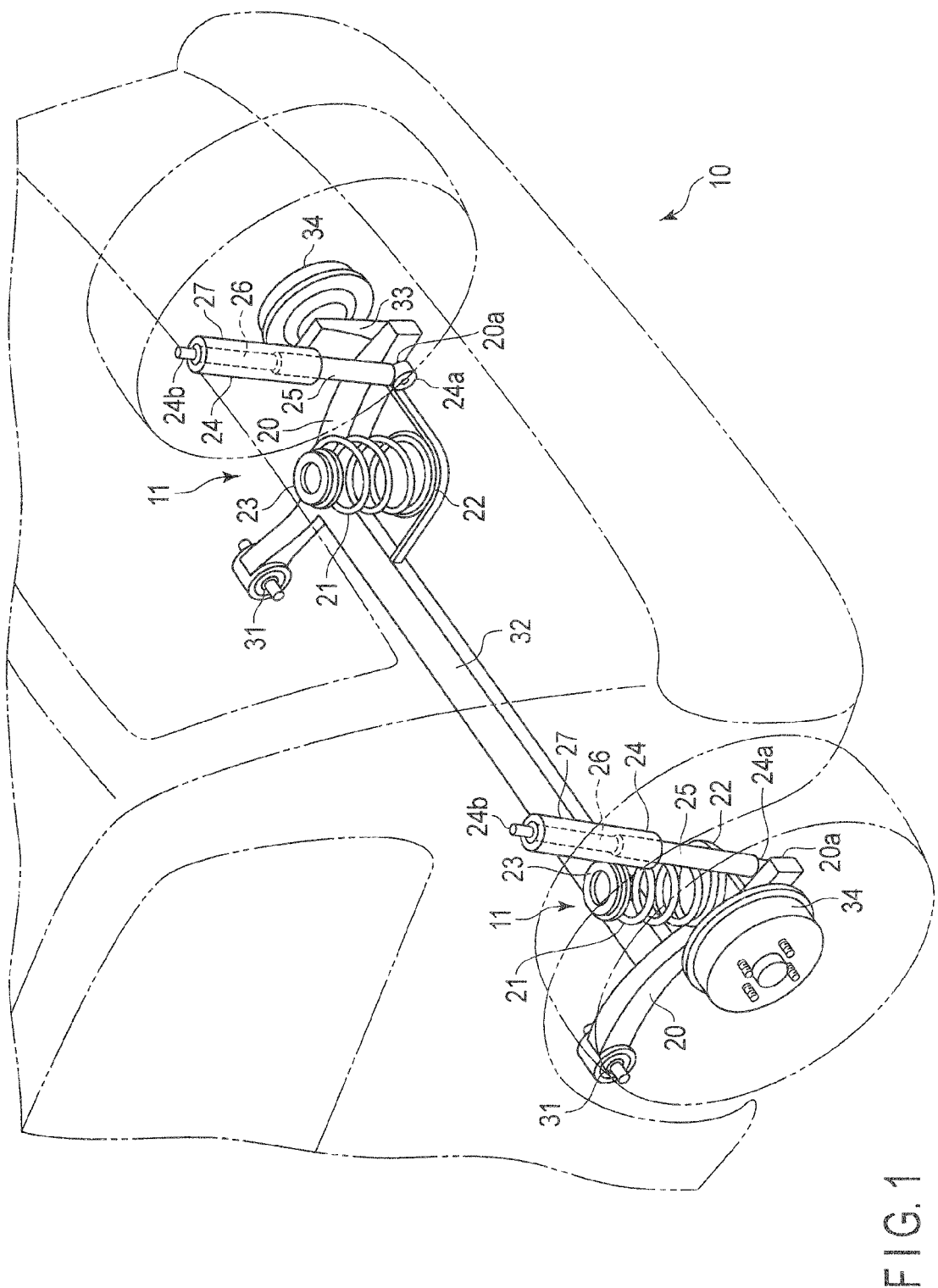
F I G. 1

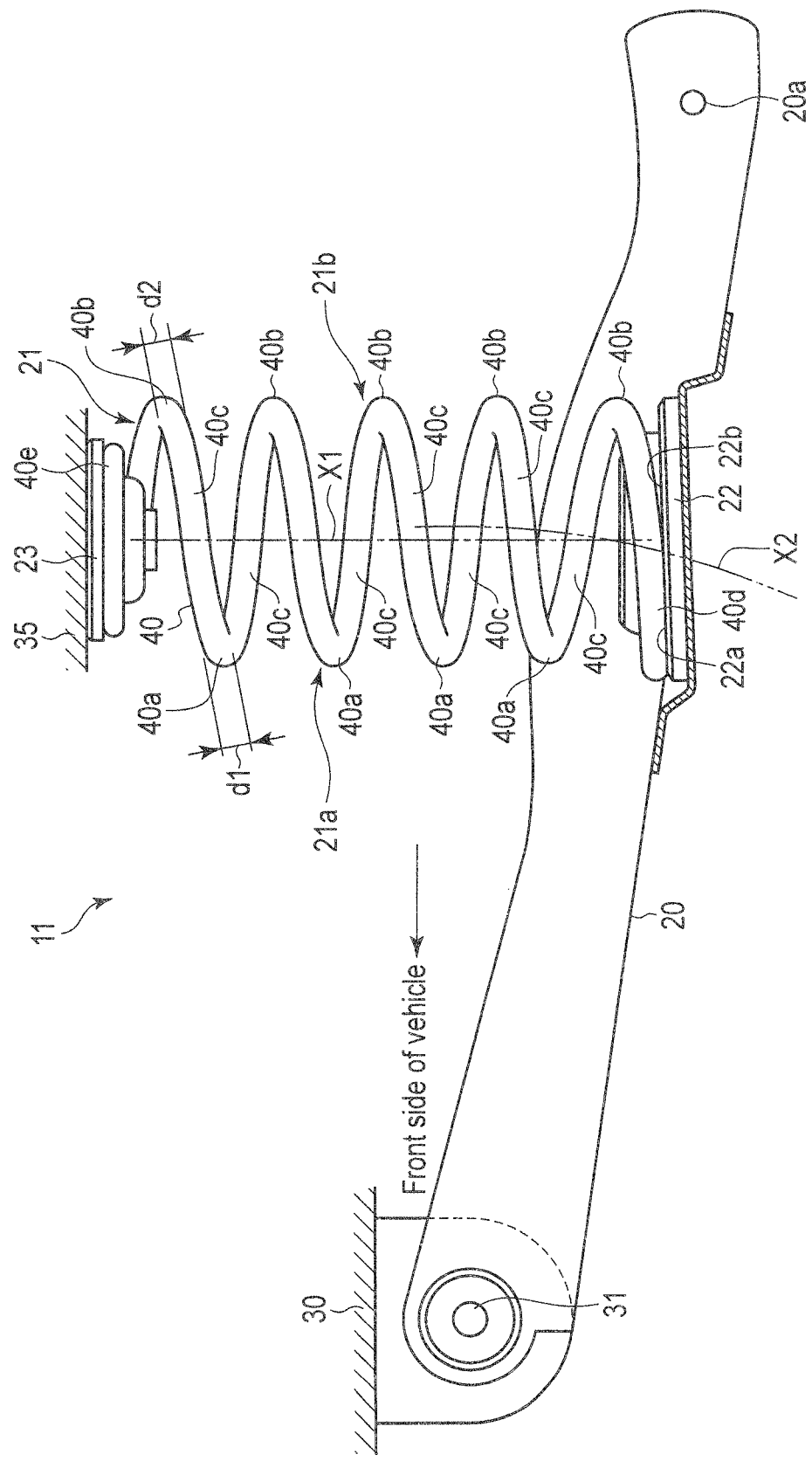
F I G. 2

SUSPENSION AND COMPRESSION COIL SPRING FOR SUSPENSION

CROSS REFERENCE TO RELATED APPLICATIONS

This application is a Continuation application of PCT Application No. PCT/JP2013/080811, filed Nov. 14, 2013 and based upon and claiming the benefit of priority from prior Japanese Patent Application No. 2012-252520, filed Nov. 16, 2012, the entire contents of all of which are incorporated herein by reference.

BACKGROUND OF THE INVENTION

1. Field of the Invention

The present invention relates to a knee-action-type suspension applied to a vehicle such as a car, and a compression coil spring for suspension (hereinafter referred to as a suspension coil spring).

2. Description of the Related Art

Patent Document 1 (Jpn. Pat. Appin. KOKAI Publication No. 2004-50906) discloses a knee-action-type suspension which is used in a suspension mechanism part of a vehicle such as a car. This type of suspension comprises an arm member, a compression coil spring which serves as a suspension spring, a lower spring seat, an upper spring seat, a shock absorber which restrains a vertical shock of the arm member, and the like. The arm member is supported in such a way that it is pivotable in the upward and downward directions by a pivot provided in a vehicle body. The lower spring seat is disposed on the lower side of the compression coil spring. The upper spring seat is disposed on the upper side of the compression coil spring.

In this field, from a standpoint of reducing the weight of a vehicle, reducing the weight of a suspension compression coil spring is strongly desired. It is known that in a suspension compression coil spring, a stress which is produced in each part of a wire is generally not constant in a state where a load is applied. In order to reduce the weight of such a compression coil spring, it is effective to approximate a stress distribution of the wire to a uniform distribution (i.e., make it flat) as much as possible. As one way of uniforming the stress distribution of a compression coil spring, varying the wire diameter in one turn of a wire has been proposed, as described in Patent Document 2 (Jpn. Pat. Appin. KOKAI Publication No. 59-219534). For example, in a coil spring in which an external force acting point is offset in a radial direction of the coil, reducing the diameter of a wire on the offset side has been proposed. Alternatively, in a coil spring to which a load is applied obliquely with respect to the coil central axis, forming a portion having a large wire diameter and a portion having a small wire diameter alternately in the direction of the coil central axis has been proposed.

The inventors of the present invention have studied ways to uniform a stress of a compression coil spring used in the knee-action-type suspension. For example, in a suspension in which the arm member is pivoted up and down about a pivot, it has been suggested from the past to reduce the diameter of a wire which is on the side close to the pivot, or form a portion having a large wire diameter and a portion having a small wire diameter alternately in the direction of the coil central axis. However, with such conventional technology, depending on the position of the arm member when it is moved up and down, it has been found that variations in the stress distribution of the wire are more significant on the contrary, instead of making the stress distribution more uniform.

BRIEF SUMMARY OF THE INVENTION

Accordingly, an object of the present invention is to provide a suspension whereby a stress distribution of a compression coil spring used in a knee-action-type suspension can be approximated to a uniform distribution, and a suspension compression coil spring.

The present invention relates to a knee-action-type suspension comprising: an arm member which is pivotable in upward and downward directions about a pivot supported on a vehicle body; a lower spring seat which is provided on the arm member; an upper spring seat which is disposed above the lower spring seat; and a compression coil spring which is arranged between the lower spring seat and the upper spring seat, and urges the arm member downward in a compressed state, in which a wire of the compression coil spring comprises: a large-diameter wire portion which is arranged on a side near to the pivot, and has a wire diameter which is greater than an average wire diameter of the wire; a small-diameter wire portion which is arranged on a side far from the pivot, and has a wire diameter which is smaller than the wire diameter of the large-diameter wire portion; and a wire diameter varying portion whose wire diameter is continuously varied between the large-diameter wire portion and the small-diameter wire portion.

According to the present invention, since the stress distribution of a compression coil spring for use in a knee-action-type suspension can be approximated to a uniform distribution, the weight of the suspension compression coil spring can be reduced, which in turn contributes to weight reduction of a vehicle in which the knee-action-type suspension is mounted.

In one embodiment, the arm member is a trailing arm extending in a front-rear direction of the vehicle body; the pivot is provided in a front end of the trailing arm; and in the wire, the large-diameter wire portion is provided on the side near to the pivot, and the small-diameter wire portion is provided on the side far from the pivot.

Further, in one embodiment, the lower spring seat comprises a first spring receiving portion which is on the side near to the pivot, and a second spring receiving portion which is on the side far from the pivot. In a full-rebound state of the compression coil spring, a distance between the first spring receiving portion and the upper spring seat is smaller than a distance between the second spring receiving portion and the upper spring seat. In a full-bump state of the compression coil spring, a distance between the first spring receiving portion and the upper spring seat is greater than a distance between the second spring receiving portion and the upper spring seat.

A compression coil spring for suspension according to the present invention is arranged between a lower spring seat and an upper spring seat of a knee-action-type suspension, which comprises an arm member which is pivotable in upward and downward directions about a pivot supported on a vehicle body. The compression coil spring comprises a wire that is formed into a helical shape, and the wire comprises: a large-diameter wire portion which is arranged on a side near to the pivot, and has a wire diameter which is greater than an average wire diameter of the wire; a small-diameter wire portion which is arranged on a side far from the pivot, and has a wire diameter which is smaller than the wire diameter of the large-diameter wire portion; and a wire diameter varying portion whose wire diameter is continuously varied between the large-diameter wire portion and the small-diameter wire portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a perspective view which schematically shows a part of a vehicle comprising a knee-action-type suspension according to one embodiment of the present invention;

FIG. 2 is a side view of the knee-action-type suspension shown in FIG. 1;

DETAILED DESCRIPTION OF THE INVENTION

Figure 3:
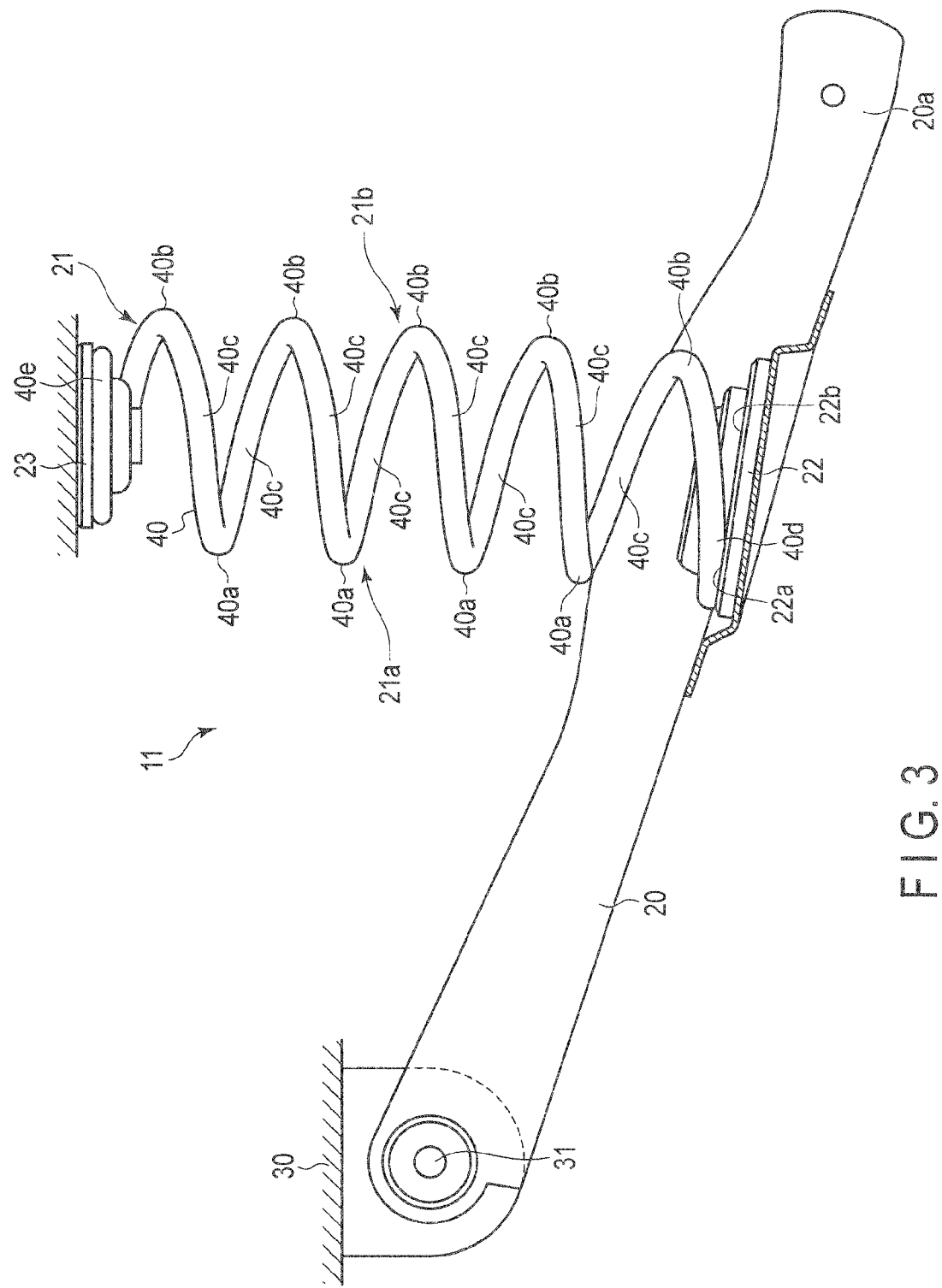
FIG. 3 is a side view of the same suspension at the time of full-rebound.

A knee-action-type suspension according to an embodiment of the present invention will now be described with reference to FIGS. 1 to 6.

FIG. 1 shows a pair of right and left trailing-arm-type suspensions 11 which are provided on a rear side of a vehicle 10. These suspensions 11 are an example of a knee-action-type suspension. Since the pair of right and left suspensions 11 have structures similar to each other, one of the suspensions 11 will be hereinafter described as a typical example of the suspensions.

FIG. 2 is a side view of the suspension 11 as seen from the side of the vehicle 10. The suspension 11 comprises an arm member 20, a compression coil spring 21, a lower spring seat 22, an upper spring seat 23, a shock absorber 24, etc. The arm member 20 serves as a trailing arm. The compression coil spring 21 serves as a suspension spring. The lower spring seat 22 is disposed on the lower side of the compression coil spring 21. The upper spring seat 23 is disposed on the upper side of the compression coil spring 21.

The compression coil spring 21 comprises a first portion 21a which is on the side near to a pivot 31, and a second portion 21b which is on the side far from the pivot 31. The lower spring seat 22 comprises a first spring receiving portion 22a which is on the side near to the pivot 31, and a second spring receiving portion 22b which is on the side far from the pivot 31. The upper spring seat 23 is disposed above the lower spring seat 22.

The shock absorber 24 comprises a cylinder 25 in which fluid such as oil is accommodated, a rod 26 which is inserted into the cylinder 25, a cover member 27, and a damping force generation mechanism which is provided within the cylinder 25. A lower end 24a of the shock absorber 24 is attached to a shock absorber mounting portion 20a of the arm member 20. An upper end 24b of the shock absorber 24 is attached to a vehicle body.

The arm member 20 is attached to an arm mounting portion 30 (FIGS. 2 to 4), which is a part of the vehicle body, such that it is pivotable in the upward and downward directions via the pivot (a pivot shaft) 31. That is, as the arm member 20 is pivoted in the upward and downward directions about the pivot 31 supported on the vehicle body, the arm member 20 is configured to perform the so-called knee action.

As shown in FIG. 1, the arm members 20 of the pair of right and left suspensions 11 are coupled to each other by a beam member 32 extending in the width direction of the vehicle body 10. The beam member 32 may be made to serve as a torsion beam which produces a repulsive force with respect to input applied in a torsional direction. The arm member 20 is provided with an axle support portion 33. The axle support portion 33 is provided with a hub unit 34 on which a tire is mounted.

The lower spring seat 22 is provided on the arm member 20. The arm member 20 and the lower spring seat 22 move up and down together. The upper spring seat 23 is provided on a spring mounting portion 35 (FIGS. 2 to 4), which is a part of the vehicle body. X2 shown in FIG. 2 is an arc-shaped trajectory with the pivot 31 being the center. The lower spring seat 22 swings up and down relatively with respect to the upper spring seat 23 along the arc-shaped trajectory X2.

The compression coil spring 21 is arranged in such a state that it is compressed between the lower spring seat 22 and the upper spring seat 23. Further, the compression coil spring 21 urges the arm member 20 relatively downward with respect to the vehicle body. Coil central axis X1 of the compression coil spring 21 extends longitudinally in the upward and downward directions.

Figure 4:
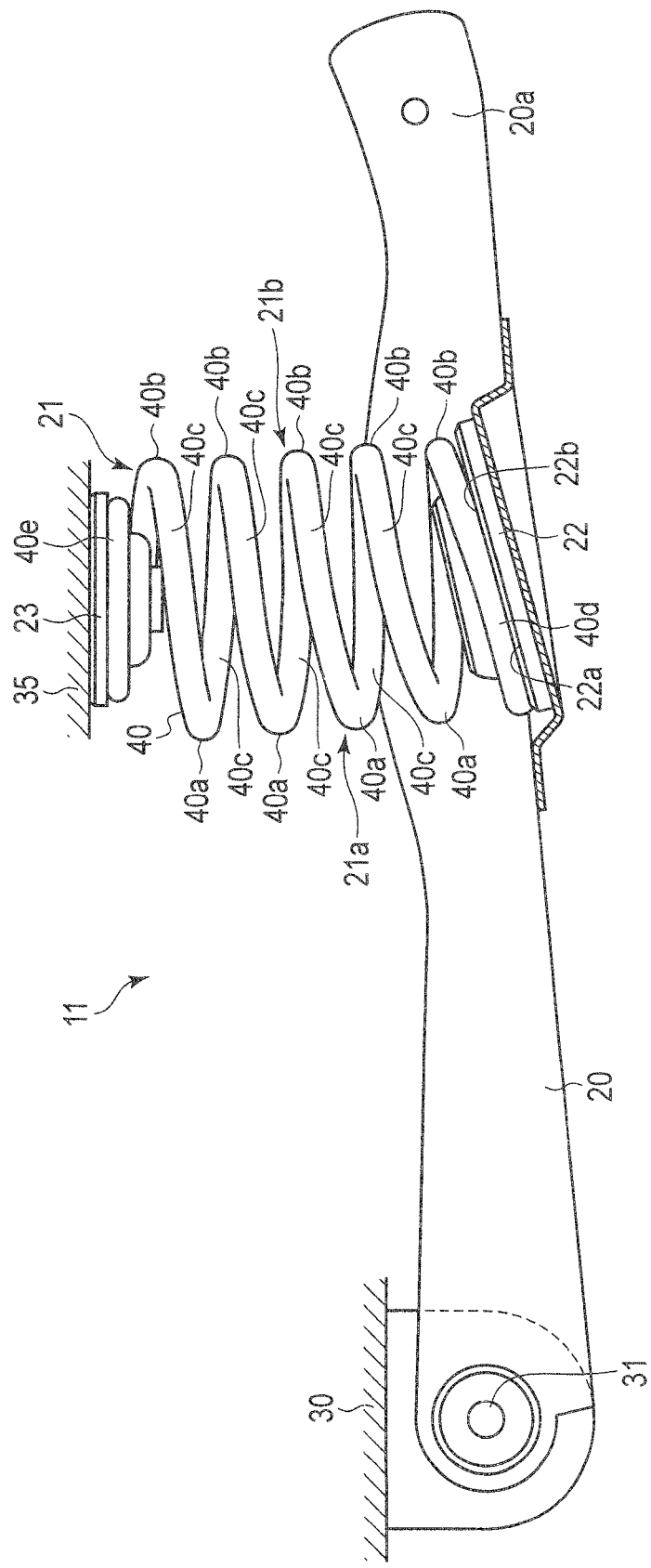
FIG. 4 is a side view of the same suspension at the time of full-bump.

FIG. 3 is a side view of the suspension 11 at the time of full-rebound, and FIG. 4 is a side view of the suspension 11 at the time of full-bump. The "full-rebound" state described in this specification refers to a state where the compression coil spring 21 is extended to the maximum by an unsprung weight including wheels and the like when the vehicle body of the vehicle 10 is lifted. In contrast, the "full-bump" state refers to a state where the compression coil spring 21 is compressed to the maximum by a load applied from the upper side of the vehicle body while the compression coil spring 21 is incorporated into the vehicle 10.

When the arm member 20 is pivoted upwardly and downwardly about the pivot 31, the shock absorber 24 is extended and retracted. Accordingly, resistance is produced in the movement of the rod 26 as the damping force generation mechanism within the cylinder 25 is operated. As a result, the upward and downward movement of the arm member 20 is restrained. That is, the compression coil spring 21 and the shock absorber 24 are extended and retracted in accordance with the position (height) of the arm member 20 which is pivoted up and down.

When the arm member 20 is pivoted upwardly and downwardly about the pivot 31, the attitude (inclination) of the lower spring arm 22 which is the moving side relative to the upper spring seat 23 is changed. For example, in the full-rebound state shown in FIG. 3, a distance between the first spring receiving portion 22a of the lower spring seat 22 and the upper spring seat 23 is smaller than a distance between the second spring receiving portion 22b of the lower spring seat 22 and the upper spring seat 23.

However, in the full-bump state shown in FIG. 4, a distance between the first spring receiving portion 22a of the lower spring seat 22 and the upper spring seat 23 is greater than a distance between the second spring receiving portion 22b and the upper spring seat 23. Accordingly, the more the compression coil spring 21 comes closes to the full-bump state from the full-rebound state as the compressive load increases, the greater the compression amount of the second portion 21b will be as compared to the first portion 21a.

Figure 5:
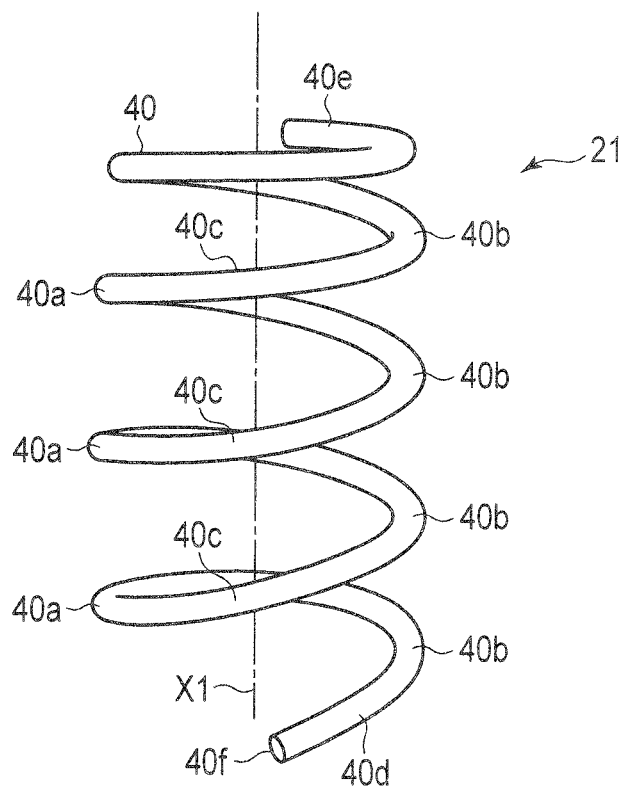
FIG. 5 is a perspective view showing an example of a compression coil spring for use in the same suspension.

FIG. 5 shows the state in which no compressive load is applied to the compression coil spring 12 (i.e., the so-called free state). In this specification, a length of the compression coil spring 21 in the free state is referred to as a free length. When a load along coil central axis X1 is applied to the compression coil spring 21, the compression coil spring 21 is compressed and deformed in the direction of making its length shorter than the free length.

The compression coil spring 21 comprises a wire 40 formed into a helical shape. The wire 40 is formed of spring steel, and its cross-section is circular. An example of the compression coil spring 21 is a cylindrical coil spring. However, according to the specification of the suspension, various forms of compression coil springs, such as a barrel-shaped coil spring, an hourglass coil spring, a tapered coil spring, a variable pitch coil spring, or a coil spring which already has bowing in the free state, may be applied.

The type of spring steel to be used as the material of the wire 40 is not particularly limited. However, SAE9254 that conforms to the "Society of Automotive Engineers" in the U.S.A. is given as an instance. The chemical components (mass %) of SAE 9254 are C: 0.51 to 0.59, Si: 1.20 to 1.60, Mn: 0.60 to 0.80, Cr: 0.60 to 0.80, S: 0.040 max., P: 0.030 max., and Fe: the remainder. As another example of the steel type, SUP7 conforming to Japanese Industrial Standards (JIS) or a steel type other than the above may be used. When spring steel which is highly resistant to corrosion is used as the material of the wire 40, the chemical components (mass %) are, for instance, C: 0.41, Si: 1.73, Mn: 0.17, Ni: 0.53, Cr: 1.05, V: 0.163, Ti: 0.056, Cu: 0.21, and Fe: the remainder.

The compression coil spring 21 is arranged in such a state that it is compressed between the lower spring seat 22 and the upper spring seat 23. Further, the compression coil spring 21 elastically supports a load applied in the upward and downward directions of the vehicle 10. The wire 40 of the present embodiment includes a large-diameter wire portion 40a and a small-diameter wire portion 40b which are formed alternately in approximately each turn of an effective portion of the coil spring 21. The large-diameter wire portion 40a is arranged on the side near to the pivot 31 with respect to a front-rear direction of the vehicle, that is, in the first portion 21a of the compression coil spring 21. Wire diameter d1 of the large-diameter wire portion 40a is greater than the average wire diameter of the effective portion of the coil spring 21.

In contrast, the small-diameter wire portion 40b is arranged on the side far from the pivot 31 with respect to the front-rear direction of the vehicle, that is, in the second portion 21b of the compression coil spring 21. Wire diameter d2 of the small-diameter wire portion 40b is smaller than wire diameter d1 of the large-diameter wire portion 40a. A wire diameter varying portion 40c whose wire diameter gradually and continuously varies (for example, to be tapered) between wire diameter d1 of the large-diameter wire portion 40a and wire diameter d2 of the small-diameter wire portion 40b is formed between the large-diameter wire portion 40a and the small-diameter wire portion 40b. Wire diameters of a lower-end-side end turn portion 40d of the compression coil spring 21 and an upper-end-side end turn portion 40e of the same are smaller than the wire diameter of the effective portion, and take the minimum value, respectively.

The lower-end-side end turn portion 40d contacts an upper surface of the lower spring seat 22. The lower spring seat 22 comprises a first spring receiving portion 22a which is on the side near to the pivot 31, and a second spring receiving portion 22b which is on the side far from the pivot 31. The first spring receiving portion 22a supports an end turn part on the side near to the pivot 31 of the lower-end-side end turn portion 40d. The second spring receiving portion 22b supports an end turn part on the side far from the pivot 31 of the lower-end-side end turn portion 40d. The upper-end-side end turn portion 40e contacts a lower surface of the upper spring seat 23.

Figure 6:
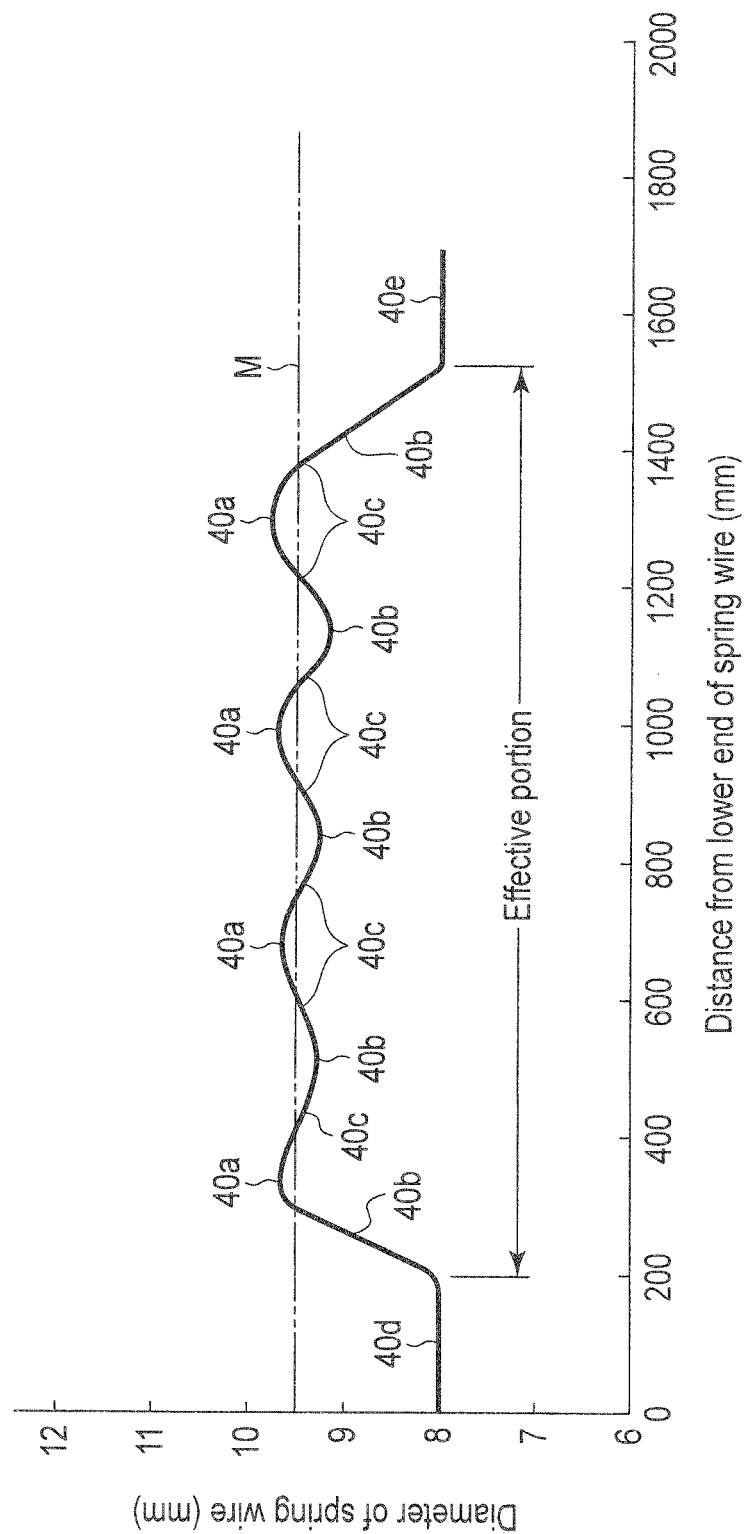
FIG. 6 is an illustration showing the relationship between a distance from a lower end of a wire of the compression coil spring shown in FIG. 5 and a diameter of the wire.

FIG. 6 shows an example of the relationship between a distance from a lower end 40f (FIG. 5) of the wire 40 and the wire diameter. As shown in FIG. 6, the wire diameter varies according to a position of wire turns from the lower end 40f. That is, in the effective portion of the compression coil spring 21, the large-diameter wire portion 40a, which takes the maximum value of wire diameter in the first portion 21a, and the small-diameter wire portion 40b, which takes the minimum value of wire diameter in the second portion 21b, are alternately formed in approximately each turn. In the example shown in FIG. 6, the maximum value of the large-diameter wire portion 40a is 9.6 to 9.8 mm, the minimum value of the small-diameter wire portion 40b is 9.1 to 9.2 mm, and the average wire diameter of the effective portion is 9.55 mm. The wire diameter of the wire diameter varying portion 40c continuously varies between the maximum value of the wire diameter and the minimum value of the wire diameter. Each of the wire diameters of the end turn portions 40d and 40e is 8 mm, which is the minimum value. Two-dot chain line M in FIG. 6 represents a conventional coil spring having a constant wire diameter.

The wire 40 of the present embodiment has its diameter varied continuously in the longitudinal direction. The wire 40 whose diameter varies as described above can be formed by a machine processing such as cutting, diameter reduction (a type of forging) by a swaging machine, or plastic working such as a press. In the case of cutting processing, there are problems such as a boundary portion, which causes stress concentration, being created in a portion in which the wire diameter varies, or a metal flow of a metal structure being broken by the cutting. In contrast, by adopting the swaging processing, the problem caused by the cutting processing can be avoided, and it is possible to form the portion in which the wire diameter varies to be smooth and continuous. Note that the large-diameter wire portion 40a, the small-diameter wire portion 40b, the wire diameter varying portion 40c, and the end turn portions 40d and 40e can be formed even by a dieless working apparatus which draws a material between a supply-side roller and a draw-side roller.

The wire 40 which has been processed by these processing means is formed into a helical shape by a bending process (for example, a hot coiling process).

Further, after performing heat treatment such as annealing and shot peening, adjustment such as setting is performed as necessary, and then coating and quality inspection are performed before a product (the compression coil spring 21) is completed.

A load is applied to the suspension 11 into which the compression coil spring 21 is incorporated from the upper side of the vehicle body. The compression coil spring 21 is compressed and deformed between the lower spring seat 22 and the upper spring seat 23 in accordance with this load. The arm member 20 is moved up and down about the pivot 31 in accordance with the amount of compression of the compression coil spring 21. That is, the arm member 20 is moved between the full-rebound position shown in FIG. 3 and the full-bump position shown in FIG. 4.

At the time of full-rebound shown in FIG. 3, a distance between the first spring receiving portion 22a to the upper spring seat 23 is smaller than a distance between the second spring receiving portion 22b and the upper spring seat 23. When the arm member 20 reaches the full-bump state shown in FIG. 4 via the neutral state shown in FIG. 2, a distance between the first spring receiving portion 22a and the upper spring seat 23 becomes greater than a distance between the second spring receiving portion 22b and the upper spring seat 23.

That is, as compared to the first portion 21a, the more the arm member 20 comes close to the full-bump state from the full-rebound state, the more the rate of increase of the amount of compression of the second portion 21b of the compression coil spring 21 increases. The time when the stress produced in the compression coil spring 21 becomes maximum is when the compression coil spring 21 is compressed to the maximum (i.e., in the full-bump state).

The compression coil spring 21 of the present embodiment is applied to a knee-action-type suspension 11 in which the arm member 20 is moved up and down between the full-rebound state and the full-bump state. In the knee-action-type suspension 11, a degree of compression of the second portion 21b around the full-bump is greater than a degree of compression of the first portion 21a. By providing the small-diameter wire portion 40b in the second portion 21b, even in a state in which the compression coil spring 21 is further compressed from the neutral state, a stress distribution can be approximated to a uniform distribution. Also, as compared to a conventional compression coil spring whose wire diameter is constant, stress amplitude can be reduced.

For example, in a conventional compression coil spring, the wire diameter is 9.6 mm, the total number of turns is 5.39, the spring constant is 30.0 N/mm, and the weight is 1.7 kg, whereas in the compression coil spring 21 of the present embodiment, wire diameter d1 of the large-diameter wire portion 40a is 9.7 mm, wire diameter d2 of the small-diameter wire portion 40b is 9.1 mm, the average wire diameter is 9.4 mm, the total number of turns is 4.93, the spring constant is 30.0 N/mm, and the weight is 1.5 kg. Thus, a weight reduction of 12.0% as compared to the conventional product is enabled.

Needless to say, in carrying out the present invention, in addition to the specific shape and dimension, the number of turns, the material (steel type), and the spring constant of the compression coil spring which constitutes the knee-action-type suspension, the form, the structure, the arrangement and the like of the arm member and the upper and lower spring seats, for example, may be modified variously. A trailing-arm-type suspension, which is an example of the knee-action-type suspension, is intended to cover a full-trailing-arm-type suspension in which the axial line of a pivot is parallel to the width direction of a vehicle, and a semi-trailing-arm-type suspension in which the axial line of a pivot forms an angle with respect to the width direction of a vehicle.

A suspension compression coil spring of the present invention can be applied to a knee-action-type suspension including a leading-arm-type suspension and a swing-arm-type suspension, that is, a suspension in which an arm member is pivoted upward and downward about a pivot, and a relative attitude (inclination) of a lower spring seat with respect to an upper spring seat is changed according to a position of the arm member which is defined in accordance with the upward and downward movement of the arm member.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A knee-action-type suspension comprising:
    an arm member which is pivotable in upward and downward directions about a pivot supported on a vehicle body;
    a lower spring seat which is provided on the arm member;
    an upper spring seat which is disposed above the lower spring seat; and
    a compression coil spring which is arranged between the lower spring seat and the upper spring seat, and urges the arm member downward in a compressed state,
    a wire of the compression coil spring comprising:
    a large-diameter wire portion which is arranged on a side near to the pivot, and has a wire diameter which is greater than an average wire diameter of the wire;
    a small-diameter wire portion which is arranged on a side far from the pivot, and has a wire diameter which is smaller than the wire diameter of the large-diameter wire portion; and
    a wire diameter varying portion whose wire diameter is continuously varied between the large-diameter wire portion and the small-diameter wire portion.

2. The suspension of claim 1, wherein:
    the arm member is a trailing arm extending in a front-rear direction of the vehicle body;
    the pivot is provided in a front end of the trailing arm; and
    in the wire, the large-diameter wire portion is provided on the side near to the pivot, and the small-diameter wire portion is provided on the side far from the pivot.

3. The suspension of claim 2, wherein the lower spring seat comprises a first spring receiving portion which is on the side near to the pivot, and a second spring receiving portion which is on the side far from the pivot, and wherein
    in a full-rebound state of the compression coil spring, a distance between the first spring receiving portion and the upper spring seat is smaller than a distance between the second spring receiving portion and the upper spring seat; and
    in a full-bump state of the compression coil spring, a distance between the first spring receiving portion and the upper spring seat is greater than a distance between the second spring receiving portion and the upper spring seat.

4. The suspension of claim 1, wherein the lower spring seat comprises a first spring receiving portion which is on the side near to the pivot, and a second spring receiving portion which is on the side far from the pivot, and wherein
    in a full-rebound state of the compression coil spring, a distance between the first spring receiving portion and the upper spring seat is smaller than a distance between the second spring receiving portion and the upper spring seat; and in a full-bump state of the compression coil spring, a distance between the first spring receiving portion and the upper spring seat is greater than a distance between the second spring receiving portion and the upper spring seat.

* * * * *